US012293705B2

(12) United States Patent
Chen et al.

(10) Patent No.: US 12,293,705 B2
(45) Date of Patent: May 6, 2025

(54) PIXEL COMPENSATION CIRCUIT, DRIVE METHOD THEREOF, AND DISPLAY PANEL

(71) Applicant: Shenzhen China Star Optoelectronics Semiconductor Display Technology Co., Ltd., Guangdong (CN)

(72) Inventors: Yuwen Chen, Guangdong (CN); Zhongzhi Shen, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/509,341

(22) Filed: Nov. 15, 2023

(65) Prior Publication Data

US 2024/0304135 A1 Sep. 12, 2024

(30) Foreign Application Priority Data

Mar. 10, 2023 (CN) ........................ 202310276159.5

(51) Int. Cl.
*G09G 3/3275* (2016.01)
*G09G 3/32* (2016.01)

(52) U.S. Cl.
CPC ....... *G09G 3/32* (2013.01); *G09G 2300/0819* (2013.01); *G09G 2300/0842* (2013.01); *G09G 2310/08* (2013.01); *G09G 2320/0233* (2013.01); *G09G 2320/045* (2013.01)

(58) Field of Classification Search
CPC ............ G09G 3/32; G09G 2300/0819; G09G 2300/0842; G09G 2310/08; G09G 2320/0233; G09G 2320/045; G09G 3/3233
See application file for complete search history.

(56) References Cited

U.S. PATENT DOCUMENTS

2019/0066578 A1* 2/2019 Chen .................... G09G 3/3233
2019/0180675 A1* 6/2019 Jang ..................... G09G 3/3233
2022/0114971 A1* 4/2022 Chen .................... G09G 3/3233

* cited by examiner

*Primary Examiner* — Abdul-Samad A Adediran
(74) *Attorney, Agent, or Firm* — PV IP PC; Wei Te Chung

(57) ABSTRACT

Disclosed are a pixel compensation circuit, a drive method thereof, and a display panel. The pixel compensation circuit includes a drive transistor, a data write module, a first initialization module, a second initialization module, a storage capacitor, and a light-emitting device. The drive timing of the pixel compensation circuit includes a threshold voltage compensation stage in which a detected threshold voltage of the drive transistor is less than an actual threshold voltage of the drive transistor.

16 Claims, 3 Drawing Sheets

PIXEL COMPENSATION CIRCUIT, DRIVE METHOD THEREOF, AND DISPLAY PANEL

CROSS-REFERENCE TO RELATED APPLICATION

This application claims the benefit of priority to Chinese Patent Application No. 202310276159.5 filed on Mar. 10, 2023, the content of which is incorporated herein by reference in its entirety.

TECHNICAL FIELD

The present disclosure relates to a display technology field, and more particularly, to a pixel compensation circuit, a drive method thereof, and a display panel.

BACKGROUND

An organic light-emitting diode (OLED) display gradually becomes a high-end display that replaces a liquid crystal display due to its advantages of ultra-high contrast, wide color gamut, fast response, active light emission, or the like. In a conventional pixel drive circuit, it is common to drive a light-emitting device in a current drive mode to emit light. However, the current drive mode is sensitive to the electrical variation of the drive transistor, and the threshold voltage drift of the drive transistor affects the brightness uniformity of the displayed picture.

Pixel compensation circuits have been developed in the art to detect and compensate the threshold voltage of the drive transistor and ensure display uniformity. However, when the pixel compensation circuit of the large-size OLED display is evaluated and simulated, it is obtained that the compensation range for the threshold voltage of the drive transistor is −0.3V to 0.3V. When the threshold voltage drift of the drive transistor is greater, the compensation capability is obviously narrower.

SUMMARY

The present disclosure provides a pixel compensation circuit, a drive method thereof, and a display panel to solve a technical problem in the prior art that a threshold voltage compensation range of the pixel compensation circuit is narrower.

According to a first aspect, the present disclosure provides a pixel compensation circuit including:

- a drive transistor having a gate connected to a first node, a drain connected to a first power supply terminal, and a source connected to a second node;
- a data write module connected to a first control signal line, a data line, and the first node, and transmitting a data signal transmitted by the data line to the first node in response to a first control signal transmitted by the first control signal line;
- a first initialization module connected to a second control signal line, a first wiring, and the second node, and transmitting a first initialization signal transmitted by the first wiring to the second node in response to a second control signal transmitted by the second control signal line;
- a second initialization module connected to a third control signal line, a second wiring, and the first node, and transmitting a second initialization signal transmitted by the second wiring to the first node in response to a third control signal transmitted by the third control signal line;
- a storage capacitor having two plates connected to the first node and the second node, respectively; and
- a light-emitting device, where one terminal of the light-emitting device is connected to the first power supply terminal, and the other terminal of the light-emitting device is connected to the second power supply terminal;
- where drive timing of the pixel compensation circuit includes a threshold voltage compensation stage in which a detected threshold voltage of the drive transistor is less than an actual threshold voltage of the drive transistor.

According to a second aspect, the present disclosure provides a drive method of a pixel compensation circuit for driving any one of the above pixel compensation circuits, the drive method including:

- initializing potentials of the second node and the first node;
- determining a pulse width of the third control signal such that the detected threshold voltage of the drive transistor is less than the actual threshold voltage of the drive transistor during the threshold voltage compensation stage; and
- driving the light-emitting device by the data signal to emit light.

According to a third aspect, the present disclosure further provides a display panel including a plurality of pixel units arranged in an array, each of the pixel units including any one of the above pixel compensation circuits, or is driven by one of the above drive methods.

Disclosed are a pixel compensation circuit, a drive method thereof, and a display panel. The pixel compensation circuit includes a drive transistor, a data write module, a first initialization module, a second initialization module, a storage capacitor, and a light-emitting device. The drive timing of the pixel compensation circuit 100 includes a threshold voltage compensation stage in which the detected threshold voltage of the drive transistor is less than the actual threshold voltage of the drive transistor. The pixel compensation circuit 100 according to an embodiment of the present disclosure may detect and compensate the threshold voltage of the drive transistor, and remove the influence of the threshold voltage offset of the drive transistor on the current flowing through the light-emitting device. In addition, in an embodiment of the present disclosure, the detected threshold voltage in the threshold voltage compensation stage is set to be less than the actual threshold voltage, that is, the gate-source voltage Vgs detected in the threshold voltage compensation stage is greater than the actual threshold voltage, so that the function of over-detection is realized, the compensation range for the threshold voltage of the drive transistor may be greatly improved, and the display uniformity of the display panel 1000 may be improved.

BRIEF DESCRIPTION OF THE DRAWINGS

In order that technical solutions in embodiments of the present disclosure may be more clearly described, reference will now be made briefly to the accompanying drawings required for the description of the embodiments. It will be apparent that the accompanying drawings in the following description are merely some of the embodiments of the present disclosure, and other drawings may be made to those skilled in the art without involving any inventive effort.

DETAILED DESCRIPTION

In the following, technical solutions in embodiments of the present disclosure will be clearly and completely described in connection with the accompanying drawings in the embodiments of the present disclosure. It will be apparent that the described embodiments are merely a part of the embodiments of the present disclosure, rather than all the embodiments. Based on the embodiments in the present disclosure, all other embodiments obtained by a person skilled in the art without involving any inventive effort fall within the scope of the present disclosure.

In the description of the present disclosure, it is to be understood that the terms “first” and “second” are used for description only and are not to be construed as indicating or implying relative importance or implying the number of indicated technical features. Limitations defined by such as “first” and “second” may expressly or implicitly include one or more of the said features, and therefore cannot be construed as a limitation of the present application. Furthermore, it should be noted that, unless otherwise expressly provided and limited, the terms “connected” and “coupled” are to be understood in a broad sense, for example, mechanically or electrically connected, directly or indirectly connected through an intermediate medium, or be an internal communication within the two elements. The specific meaning of the above terms in the present disclosure may be understood by those of ordinary skill in the art.

The present disclosure provides a pixel compensation circuit, a drive method thereof, and a display panel, which are described in detail below. It should be noted that the order in which the following embodiments are described is not intended to limit the preferred order of the embodiments of the present disclosure.

Figure 1:
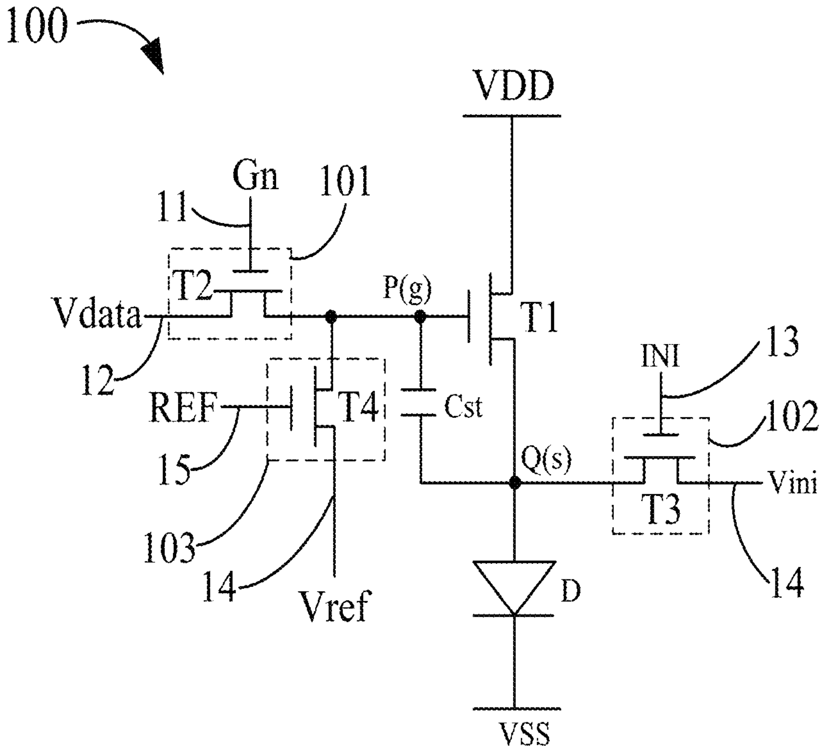
FIG. 1 is a schematic circuit structure of a pixel compensation circuit according to an embodiment of the present disclosure.

Referring to FIG. 1, FIG. 1 is a schematic circuit diagram of a pixel compensation circuit according to an embodiment of the present disclosure. In an embodiment of the present disclosure, the pixel compensation circuit 100 includes a drive transistor T1, a data write module 101, a first initialization module 102, a second initialization module 103, a storage capacitor C, and a light-emitting device D.

A gate of the drive transistor T1 is connected to a first node P. A drain of the drive transistor T1 is connected to a first power supply terminal, and a source of the drive transistor T1 is connected to a second node Q.

The data write module 101 is connected to a first control signal line 11, a data line 12, and a first node P. The data write module 101 transmits a data signal Vdata transmitted by the data line 12 to the first node P in response to a first control signal Gn transmitted by the first control signal line 11.

The first initialization module 102 is connected to a second control signal line 13, a first wiring 14, and the second node Q. The first initialization module 102 transmits a first initialization signal Vini transmitted by the first wiring 14 to the second node Q in response to a second control signal INI transmitted by the second control signal line 13.

The second initialization module 103 is connected to a third control signal line 15, a second wiring 16, and the first node P. The second initialization module 103 transmits a second initialization signal Vref transmitted by the second wiring 16 to the first node P in response to a third control signal REF transmitted by the third control signal line 15.

The two plates of the storage capacitor C are connected to the first node P and the second node Q, respectively.

One terminal of the light-emitting device D is connected to a first power supply terminal VDD. The other terminal of the light-emitting device is connected to a second power supply terminal VSS.

The drive timing of the pixel compensation circuit 100 includes a threshold voltage compensation stage in which a detected threshold voltage of the drive transistor T1 is less than an actual threshold voltage of the drive transistor T1.

It will be appreciated that in the pixel compensation circuit 100, a detected threshold voltage of the drive transistor T1 needs to be determined by detecting a gate-source voltage Vgs of the drive transistor T1 (i.e., detecting the voltage difference between the first node P and the second node Q) during the threshold voltage compensation stage. Therefore, in an embodiment of the present disclosure, the detected threshold voltage detected in the threshold voltage compensation stage is the gate-source voltage Vgs of the drive transistor T1.

In the pixel compensation circuit 100 according to an embodiment of the present disclosure, the threshold voltage of the drive transistor T1 may detected and compensated, and the influence of the threshold voltage offset of the drive transistor T1 on the current flowing through the light-emitting device D may be removed. In addition, in an embodiment of the present disclosure, the detected threshold voltage obtained in the threshold voltage compensation stage is provided to be less than an actual threshold voltage. That is, the gate-source voltage Vgs of the drive transistor T1 detected in the threshold voltage compensation stage is provided greater than the actual threshold voltage, so that the over-detection function is realized. As a result, the compensation range for the threshold voltage of the drive transistor T1 may be greatly increased, and the display uniformity may be improved.

Further with reference to FIG. 1, in some embodiments of the present disclosure, the data write module 101 includes a first transistor T2. A gate of the first transistor T2 is connected to a first control signal line 11. A drain of the first transistor T2 is connected to a data line 12. A source of the first transistor T2 is connected to a first node P. A configuration of the data write module 101 in an embodiment of the present disclosure is not limited thereto.

In some embodiments of the present disclosure, the first initialization module 102 includes a second transistor T3. A gate of the second transistor T3 is connected to a second control signal line 13. A drain of the second transistor T3 is connected to a first wiring 14. A source of the second transistor T3 is connected to a second node Q. A configuration of the first initialization module 102 in an embodiment of the present disclosure is not limited thereto.

In some embodiments of the present disclosure, the second initialization module 103 includes a third transistor T4. A gate of the third transistor T4 is connected to a third control signal line 15. A drain of the third transistor T4 is connected to a second wiring 16. A source of the third transistor T4 is connected to the first node P. The configuration of the first initialization module 102 in an embodiment of the present disclosure is not limited thereto.

In some embodiments of the present disclosure, an anode of the light-emitting device D is connected to the second node Q. A cathode of the light-emitting device D is connected to a second power supply terminal VSS. The voltage of the power supply signal output by the first power supply terminal VDD is greater than the voltage of the power supply signal output by the second power supply terminal VSS.

The light-emitting device D may be a mini light-emitting diode, a micro light-emitting diode, or an organic light-emitting diode, which is not specifically limited in the present disclosure.

It should be noted that the transistors in all embodiments of the present disclosure may be thin film transistors, field effect transistors or other devices having the same characteristics. Since the source and drain of the transistors herein are symmetrical, the source and drain thereof are interchangeable. In an embodiment of the present disclosure, to distinguish between two electrodes of the transistor except the gate, one of the two electrodes is referred to as a source and the other of the two electrodes is referred to as a drain. According to the configuration in the drawings, a middle terminal of the switch transistor is a gate, a signal input terminal of the switch transistor is a drain, and an output terminal of the switch transistor is a source. The transistors in an embodiment of the present disclosure may include both a P-type transistor and/or an N-type transistor. The P-type transistor is turned on when the gate is at a low level and is turned off when the gate is at a high level. The N-type transistor is turned on when the gate is at a high level and turned off when the gate is at a low level.

In addition, an embodiment of the present disclosure is described below with an example in which each transistor in the pixel compensation circuit 100 is an N-type transistor. The present disclosure is not limited herein.

Figure 2:
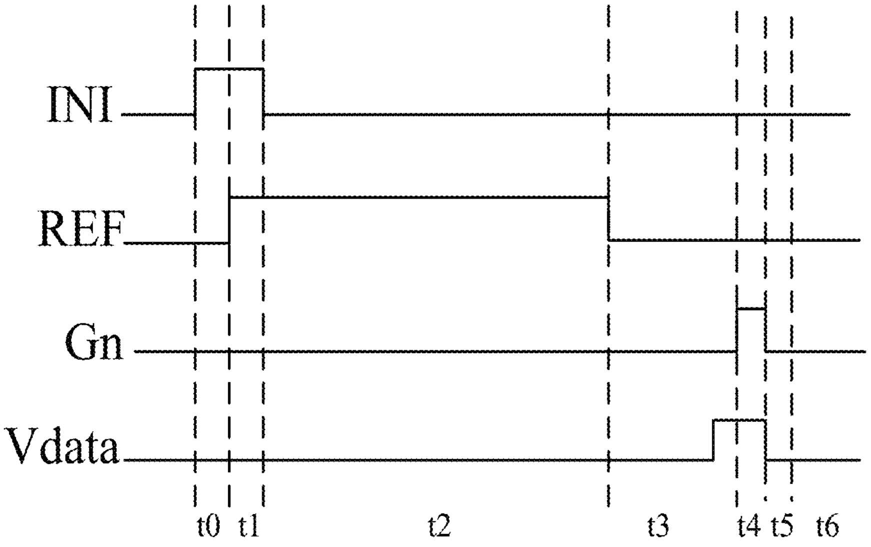
FIG. 2 is a first signal timing diagram of the pixel compensation circuit shown in FIG. 1.

Referring to FIGS. 1 and 2, FIG. 2 is a first signal timing diagram of the pixel compensation circuit shown in FIG. 1. Referring to FIGS. 1 and 2, the first control signal G1, the second control signal INI, and the third control signal REF are differently combined in the reset stage, the threshold voltage compensation stage, the data write stage, and the light-emitting stage t6. That is, during a frame, the drive timing of the pixel compensation circuit 100 according to an embodiment of the present disclosure includes a reset stage, a threshold voltage compensation stage, a data write stage, and a light-emitting stage t6.

The reset stage includes a first reset stage t0 and a second reset stage t1.

In the first reset stage t0, the first control signal Gn and the third control signal REF are both at low levels, and the first transistor T2 and the third transistor T4 are both turned off. The second control signal INI is at a high level, and the second transistor T3 is turned on. The first initialization signal Vint is transmitted to the second node Q via the second transistor T3, that is, the source of the drive transistor T1, to initialize the potential of the source of the drive transistor T1.

In the second reset stage t1, the first control signal Gn and the second control signal INI are at low levels, and both the first transistor T2 and the second transistor T3 are turned off. The third control signal REF is at a high level, and the third transistor T4 is turned on. The second initialization signal Vref is transmitted to the first node P via the third transistor T4, that is, the gate of the drive transistor T1 to initialize the potential of the gate of the drive transistor T1.

The threshold voltage compensation stage includes a first compensation stage t2 and a second compensation stage t3.

In the first compensation stage t2, the first control signal Gn and the second control signal INI are kept at low levels, and the third control signal REF is kept at a high level. The drive transistor T1 is turned on, and the power supply signal output from the first power supply terminal VDD charges the second node Q (the source s of the drive transistor T1) until the potential of the second node Q gradually changes from the potential of the first initialization signal Vint to the difference between the potential of the second initialization signal Vref and the threshold voltage of the drive transistor T1, and the drive transistor T1 is turned off. Thus, the actual threshold voltage of the drive transistor T1 is detected. That is, in the present embodiment, the detected threshold voltage of the drive transistor T1 is same as the actual threshold voltage of the drive transistor T1.

In the second compensation stage t3, the first control signal Gn, the second control signal INI, and the third control signal REF are all at low levels. The second compensation stage t3 is provided to make the detection time for the threshold voltage of the drive transistor T1 adjustable. That is, the detection time for the threshold voltage of the drive transistor T1 may be adjusted from the duration of the first compensation stage t2 to the sum of the durations of the first compensation stage t2 and the second compensation stage t3. It is to be understood that the threshold voltages are different and thus the detection durations are different, and the driver transistors T1 with different threshold voltages may be applied in an embodiment of the present application.

The data write stage includes a first write stage t4 and a second write stage t5.

In the first write stage t4, the second control signal INI and the third control signal REF are both at low levels, and the second transistor T3 and the third transistor T4 are both turned off. The first control signal Gn is at a high level, and the first transistor T2 is turned on. The data signal Vdata is transmitted to the gate of the drive transistor T1 via the first transistor T2.

Note that the second write stage t5 is provided to ensure that the data signal Vdata may be completely written.

In the light-emitting stage t6, the first control signal Gn, the second control signal INI, and the third control signal REF are all at low levels. The drive transistor T1 is turned on, and the current flowing through the light-emitting device D is independent of the threshold voltage of the drive transistor T1, thereby ensuring that the current flowing through the light-emitting device D is unchanged. Even if the threshold voltage of the drive transistor T1 drifts, the light-emitting device D may emit light normally, thereby improving the light emission uniformity of the display panel.

However, when the pixel compensation circuit 100 employs the first signal timing as shown in FIG. 2, the compensation range of the pixel compensation circuit 100 for the threshold voltage of the drive transistor T1 is −0.3V to 0.3V.

In theory, the current of the drive transistor of the pixel compensation circuit 100 is expressed as:

$$I=\mu\frac{W}{2L}Cox(Vgs-Vth)^2$$

In fact, there is a loss of data transfer efficiency (DTE, voltage efficiency of the writing of the data signal Vdata to the light-emitting stage) during the light-emitting stage. For ease of understanding, the slope k is defined as:

$$k=\frac{\Delta Vgs\_sense}{\Delta Vth\_drift}=\frac{(Vg2-Vs2)-(Vg1-Vs1)}{\Delta Vth\_drift}.$$

Here, Vg1 and Vg2 refer to the gate potentials of the drive transistor T1 before and after the drift of the threshold voltage, Vs1 and Vs2 refer to the source potentials of the drive transistor T1 before and after the drift of the threshold voltage, and ΔVgs_sense refers to the changed value of the actually detected gate-source voltage Vgs of the drive transistor T1. ΔVgs_drift refers to offset changed value of the actual threshold voltage of the drive transistor T1.

Here, the DTE loss may be obtained by recording the written data signal Vdata and the second initialization signal Vref by using the timing of the light-emitting stage, and at the same time by measuring the gate voltage Vg and the source voltage Vs of the driver transistor T1 during stably light-emitting period. The specific calculation formula is: DTE=(Vg−Vs)/(Vdata−Vref). According to $$I=\mu\frac{W}{2L}Cox(Vgs-Vth)^2$$

and $$k=\frac{\Delta Vgs\_sense}{\Delta Vth\_drift}=\frac{(Vg2-Vs2)-(Vg1-Vs1)}{\Delta Vth\_drift},$$

the current of the drive transistor T1 of the pixel compensation circuit 100 is:

$$I=\mu\frac{W}{2L}Cox(Vdata-Vref+\Delta Vgs\_sense-\Delta Vgs\_shift)^2$$

When in the light-emitting stage K=1, that is, ΔVgs_sense=ΔVgs_drift, it is possible to reduce the current change rate and reduce the influence of the current change caused by the threshold voltage drift, that is, to increase the compensation effect for the threshold voltage, that is, to make the current in the over-detection timing reaches the theoretical current value:

$$I=\mu\frac{W}{2L}Cox(v_{data}-v_{ref})^2$$

Figure 3:
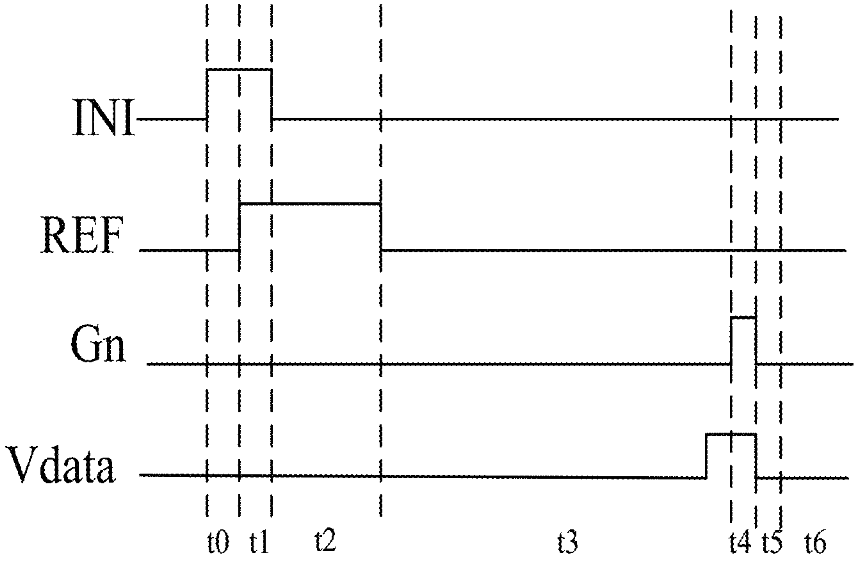
FIG. 3 is a second signal timing diagram of the pixel compensation circuit shown in FIG. 1.

In this regard, an embodiment of the present disclosure provides a second drive timing for the pixel compensation circuit 100. Referring to FIGS. 1 and 3, FIG. 3 is a second drive timing diagram of the pixel compensation circuit shown in FIG. 1. The second drive timing differs from the first drive timing shown in FIG. 2 in that in the present embodiment, the detected threshold voltage of the drive transistor T1 is less than the actual threshold voltage of the drive transistor T1 in the threshold voltage compensation stage.

Specifically, as shown in FIG. 1 and FIG. 3, in the first compensation stage t2, the pulse width of the third control signal REF is controlled so that the third transistor T4 is turned off before the source voltage Vs of the drive transistor T1 is raised to satisfy Vgs=Vth in the compensation stage, so that the gate-source voltage Vgs is insufficiently detected, so that the gate voltage Vg and the source voltage Vs are in the floating state, at which time the detected gate-source voltage Vgs is greater than the threshold voltage Vth.

The third control signal REF in the first compensation stage t2 and the third control signal REF in the second compensation stage t3 are inverted. Similarly, by the setting of the second compensation stage t3, the detection time of the threshold voltage of the drive transistor T1 may be adjustable to apply to the drive transistors T1 with different threshold voltages.

That is, in an embodiment of the present disclosure, in the detection stage, the detected threshold voltage of the drive transistor T1 is determined by the pulse width of the third control signal REF.

However, the power supply signal output from the first power supply terminal VDD continues to charge the source of the drive transistor T1, and the source voltage Vs continues to rise. Due to the coupling effect of the storage capacitor Cst, the gate voltage Vg is coupled to rise, and the rising speed of the source voltage Vs is faster than the rising speed of the gate voltage Vg. The higher the threshold voltage is, the faster the rising speed of the source voltage Vs is. The gate-source voltage Vgs is gradually reduced until the gate-source voltage Vgs is the same as Vth, and the drive transistor T1 is turned off.

Further, since K has been defined in the above embodiment, K represents a ratio of the detected threshold voltage to the actual threshold voltage. In different operation stages of the pixel compensation circuit 100, the K=1 represents that the detected threshold voltage (i.e., the detected Vgs) detected by the simulation is the same as the actual threshold voltage of the drive transistor T1. However, it is not possible in the actual situation, because there is a capacitive coupling loss and the value of K tends to decrease with time, which tends to result in a DTE loss in the light-emitting stage, i.e. the gate-source voltage Vgs in the actual light-emitting stage t6 is less than the gate-source voltage Vgs at the time of writing the data signal data.

In order to reduce the DTE loss in the light-emitting stage t6, before the write stage, i.e., the compensation stage in the operation timing of the pixel compensation circuit 100, the detected threshold voltage is greater than the actual threshold voltage, and thus the effect of over-detection compensation may be achieved, i.e., K in the period before the light-emitting stage is greater than 1. In this case, even if K falls, it is possible to make the value of K in the writing stage and the light-emitting stage t6 equal to 1, so that the current change rate generated by the threshold voltage drift is reduced.

In some embodiments of the present disclosure, the pulse widths of the third control signal REF are different, the detected threshold voltages detected at the threshold voltage detection stage are different, and the compensation ranges for the threshold voltage of the pixel compensation circuit 100 are different.

In some embodiments of the present disclosure, the duration of the reset stage is 2H. The duration of the first compensation stage t2 (i.e., the pulse width of the third control signal REF) is 12H. The duration of the second compensation stage t3 is 43H, and the duration of both the first writing stage t4 and the second writing stage t5 is 0.5H.

Thus, the threshold voltage compensation range of the pixel compensation circuit 100 may reach −0.85V to 1.45V.

Here, 1H=1/(screen refresh rate×number of lines in display screen). For example, for a display panel having a refresh rate of 120 Hz and a resolution of 2160×1800, the duration of 1H equals 1/(120×2160)=3.85 us in time units of seconds.

The present disclosure further provides a drive method of the pixel compensation circuit for driving the pixel compensation circuit 100 according to any one of the above embodiments. The drive method of the pixel compensation circuit 100 may be implemented by the steps below.

At Step S1, the potentials of the second node Q and the first node P are initialized.

The step of initializing the potentials of the second node Q and the first node P may be referred to in the above-mentioned embodiments, and details are not described herein.

At Step S2, the pulse width of the third control signal REF is determined so that the detected threshold voltage of the drive transistor T1 is less than the actual threshold voltage of the drive transistor T1 in the threshold voltage compensation stage t.

Specifically, in some embodiments of the present disclosure, Step S2 may be implemented by: setting a plurality of third control signals REF having different pulse widths; measuring respective current change rates of the current flowing through the light-emitting device under the driving of the same data signal Vdata, and determining the pulse widths of the third control signal REF according to the current change rates.

In some embodiments of the present disclosure, the calculation formula for the current change rate may be: $\Delta=(I_i-I_0)/I_0$.

Here, $I_0$ is a reference current flowing through the light-emitting device D when the detected threshold voltage is zero, and $I_i$ is a current flowing through the light-emitting device D when the detected threshold voltage is non-zero.

In some embodiments of the present disclosure, the compensation range for the threshold voltage of the drive transistor T1 includes a threshold voltage offset satisfying a current change rate of −5% to 5%.

Figure 4:
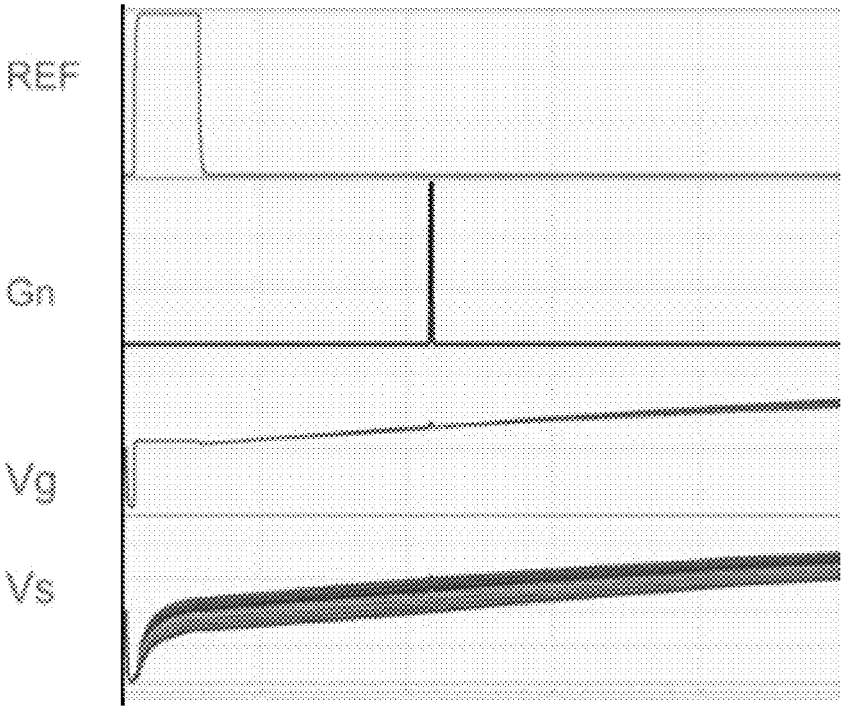
FIG. 4 is an operating timing simulation result diagram of a pixel compensation circuit according to an embodiment of the present disclosure.
Figure 5:
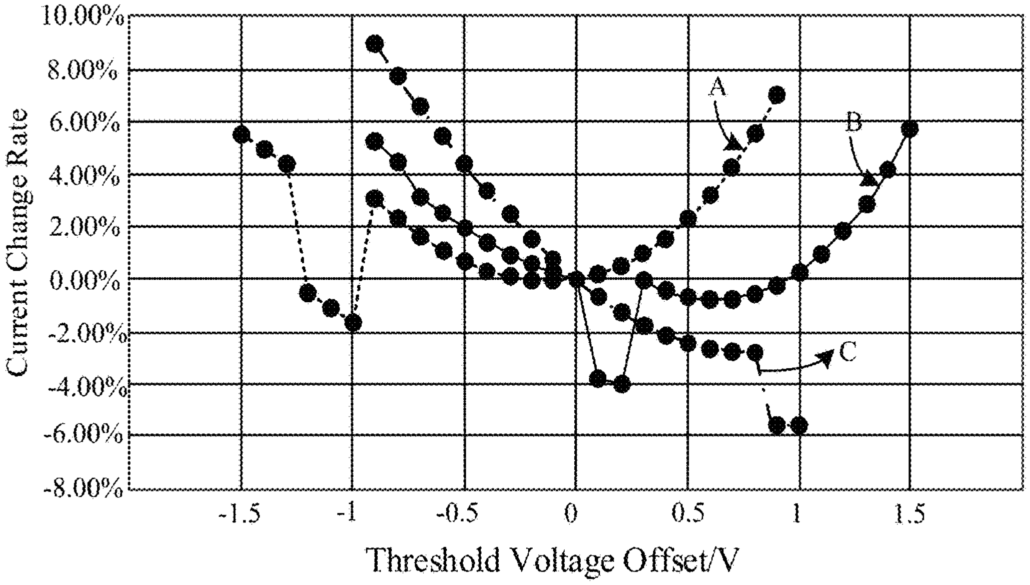
FIG. 5 is a schematic diagram showing a relationship between a current change rate and a threshold voltage offset of a drive transistor at different third control signals according to an embodiment of the present disclosure.

Specifically, referring to FIGS. 4 and 5, FIG. 4 is a simulation result of the operation timing of the pixel compensation circuit according to the present disclosure. FIG. 5 is a schematic diagram of the current change rate versus the threshold voltage offset of the drive transistor with different third control signals according to the present disclosure.

In FIG. 4, when the pulse widths of the third control signal REF are different, the changes of the gate voltage Vg and the source voltage Vs are different.

From the simulation results of FIG. 4, curves of the current change rate and the threshold voltage offset of the drive transistor are calculated at different third control signals. As shown in FIG. 5, curve A shows a relationship between the current change rate A and the threshold voltage offset of the drive transistor when the pulse width of the third control signal REF is 11H. It may be seen that the compensation range for the threshold voltage of the drive transistor T1 is −1.4V to 0.75V.

Curve B shows a relationship between the current change rate A and the threshold voltage offset of the drive transistor when the pulse width of the third control signal REF is 12H. It may be seen that the compensation range for the threshold voltage of the drive transistor T1 is −0.85V to 1.45V.

Curve C shows a relationship between the current change rate A and the threshold voltage offset of the drive transistor when the pulse width of the third control signal REF is 13H. It may be seen that the compensation range for the threshold voltage of the drive transistor T1 is −0.55V to 0.85V.

Therefore, when the pulse width of the third control signal REF is 12H, the compensation range for the threshold voltage of the drive transistor T1 is maximized. That is, it is verified that the compensation capability of the pixel compensation circuit 100 may be adjusted by adjusting the detection duration of the compensation stage detection time of the pixel compensation circuit 100.

At Step S3, the light-emitting device is driven by the corresponding data signal Vdata to emit light.

After determining the pulse width of the third control signal REF, the pixel compensation circuit 100 is normally driven, and the corresponding data signal Vdata is written, so that the light-emitting device D may be driven to emit light.

Figure 6:
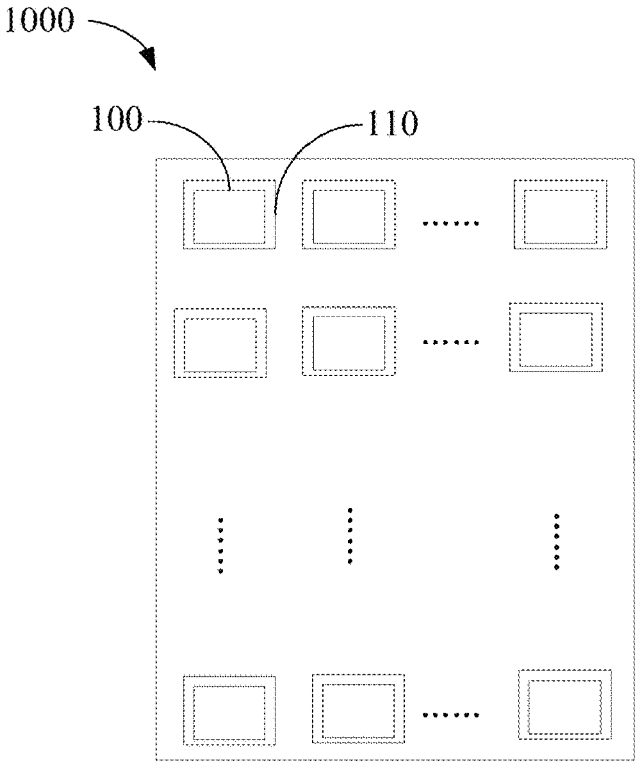
FIG. 6 is a schematic block diagram of a display panel according to an embodiment of the present disclosure.

Referring to FIG. 6, FIG. 6 is a schematic block diagram of a display panel according to an embodiment of the present disclosure. An embodiment of the present disclosure further provides a display panel 1000 including a plurality of pixel units 110 arranged in an array. Each pixel unit 110 includes the pixel compensation circuit 100 according to any one of the above embodiments or the drive method of the pixel compensation circuit 100 according to any one of the above embodiments. For details, reference may be made to the above, and details are not described herein.

In the embodiment of the present disclosure, the display panel 1000 may be an organic light-emitting diode (OLED) display panel, a mini light-emitting diode (Mini LED) display panel, a micro light-emitting diode (Micro-LED) display panel, or the like.

In the display panel 1000 according to an embodiment of the present disclosure, the pixel compensation circuit 100 includes a drive transistor, a data write module, a first initialization module, a second initialization module, a storage capacitor, and a light-emitting device. The drive timing of the pixel compensation circuit 100 includes a threshold voltage compensation stage in which the detected threshold voltage of the drive transistor is less than the actual threshold voltage of the drive transistor. The pixel compensation circuit 100 according to an embodiment of the present disclosure may detect and compensate the threshold voltage of the drive transistor, and remove the influence of the threshold voltage offset of the drive transistor on the current flowing through the light-emitting device. In addition, in an embodiment of the present disclosure, the detected threshold voltage in the threshold voltage compensation stage is set to be less than the actual threshold voltage, that is, the gate-source voltage Vgs detected in the threshold voltage compensation stage is greater than the actual threshold voltage, so that the function of over-detection is realized, the compensation range for the threshold voltage of the drive transistor may be greatly improved, and the display uniformity of the display panel 1000 may be improved.

The pixel compensation circuit, the drive method, and the display panel according to an embodiment of the present disclosure are described in detail. The principles and embodiments of the present disclosure are described by using specific examples. The description of the above embodiments is merely provided to help understand the method and the core idea of the present disclosure. At the same time, for those of ordinary skill in the art, changes may be made in both the detailed description and the scope of application in accordance with the teachings of the present disclosure. In view of the foregoing, the present specification should not be construed as limiting the application.

What is claimed is:

1. A pixel compensation circuit, comprising:

a drive transistor having a gate connected to a first node, a drain connected to a first power supply terminal, and a source connected to a second node;

a data write module connected to a first control signal line, a data line, and the first node, and transmitting a data signal transmitted by the data line to the first node in response to a first control signal transmitted by the first control signal line;

a first initialization module connected to a second control signal line, a first wiring, and the second node, and transmitting a first initialization signal transmitted by the first wiring to the second node in response to a second control signal transmitted by the second control signal line;

a second initialization module connected to a third control signal line, a second wiring, and the first node, and transmitting a second initialization signal transmitted by the second wiring to the first node in response to a third control signal transmitted by the third control signal line;

a storage capacitor having two plates connected to the first node and the second node, respectively; and a light-emitting device, wherein one terminal of the light-emitting device is connected to the first power supply terminal, and the other terminal of the light-emitting device is connected to the second power supply terminal;

wherein drive timing of the pixel compensation circuit comprises a threshold voltage compensation stage in which a detected threshold voltage of the drive transistor is less than an actual threshold voltage of the drive transistor, and wherein the detected threshold voltage of the drive transistor is determined by a pulse width of the third control signal during the threshold voltage detection stage.

2. The pixel compensation circuit according to claim 1, wherein compensation ranges for the threshold voltage of the pixel compensation circuit are different due to different pulse widths of the third control signal.

3. The pixel compensation circuit according to claim 2, wherein the compensation range for the threshold voltage of the pixel compensation circuit is −0.85V to 1.45V.

4. The pixel compensation circuit according to claim 2, wherein the threshold voltage compensation stage comprises a first compensation stage and a second compensation stage, and the third control signal in the first compensation stage and the third control signal in the second compensation stage are inverted.

5. A drive method of a pixel compensation circuit, wherein the pixel compensation circuit comprises: a drive transistor having a gate connected to a first node, a drain connected to a first power supply terminal, and a source connected to a second node; a data write module connected to a first control signal line, a data line, and the first node, and transmitting a data signal transmitted by the data line to the first node in response to a first control signal transmitted by the first control signal line; a first initialization module connected to a second control signal line, a first wiring, and the second node, and transmitting a first initialization signal transmitted by the first wiring to the second node in response to a second control signal transmitted by the second control signal line; a second initialization module connected to a third control signal line, a second wiring, and the first node, and transmitting a second initialization signal transmitted by the second wiring to the first node in response to a third control signal transmitted by the third control signal line; a storage capacitor having two plates connected to the first node and the second node, respectively; and a light-emitting device, wherein one terminal of the light-emitting device is connected to the first power supply terminal, and the other terminal of the light-emitting device is connected to the second power supply terminal, and wherein drive timing of the pixel compensation circuit comprises a threshold voltage compensation stage, the drive method comprising:

initializing potentials of the second node and the first node;

determining a pulse width of the third control signal to enable the detected threshold voltage of the drive transistor to be less than the actual threshold voltage of the drive transistor during the threshold voltage compensation stage; and driving the light-emitting device by the data signal to emit light.

6. The drive method according to claim 5, wherein the determining of the pulse width of the third control signal comprises:

setting the third control signals to be a plurality of third control signals, wherein pulse widths of the plurality of third control signals are different; and under the drive of the same data signal, measuring respective current change rates of the current flowing through the light-emitting device, and determining the pulse width of the third control signal according to the current change rates.

7. The drive method according to claim 6, wherein the calculation formula of the current change rate is: $\Delta=(I_i-I_0)/I_0$;

where $I_0$ is a reference current flowing through the light-emitting device when the detected threshold voltage is zero, and $I_i$ is a current flowing through the light-emitting device when the detected threshold voltage is non-zero.

8. The drive method according to claim 6, wherein the compensation range is provided for the threshold voltage of the drive transistor with a threshold voltage offset corresponding to the current change rate of −5% to 5%.

9. The drive method according to claim 5, wherein the detected threshold voltage of the drive transistor is determined by the pulse width of the third control signal during the threshold voltage detection stage.

10. The drive method according to claim 5, wherein compensation ranges for the threshold voltage of the pixel compensation circuit are different due to different pulse widths of the third control signal.

11. The drive method according to claim 10, wherein the co mpensation range for the threshold voltage of the pixel compensation circuit is −0.85V to 1.45V.

12. The drive method according to claim 10, wherein the threshold voltage compensation stage comprises a first compensation stage and a second compensation stage, and the third control signal in the first compensation stage and the third control signal in the second compensation stage are inverted.

13. A display panel comprising a plurality of pixel units arranged in an array, wherein each of the pixel units comprises a pixel compensation circuit, and the pixel compensation circuit comprises:

a drive transistor having a gate connected to a first node, a drain connected to a first power supply terminal, and a source connected to a second node;

a data write module connected to a first control signal line, a data line, and the first node, and transmitting a data signal transmitted by the data line to the first node in response to a first control signal transmitted by the first control signal line;

a first initialization module connected to a second control signal line, a first wiring, and the second node, and transmitting a first initialization signal transmitted by the first wiring to the second node in response to a second control signal transmitted by the second control signal line;

a second initialization module connected to a third control signal line, a second wiring, and the first node, and transmitting a second initialization signal transmitted by the second wiring to the first node in response to a third control signal transmitted by the third control signal line;

a storage capacitor having two plates connected to the first node and the second node, respectively; and a light-emitting device, wherein one terminal of the light-emitting device is connected to the first power supply terminal, and the other terminal of the light-emitting device is connected to the second power supply terminal, and wherein drive timing of the pixel compensation circuit comprises a threshold voltage compensation stage in which a detected threshold voltage of the drive transistor is less than an actual threshold voltage of the drive transistor, and wherein the detected threshold voltage of the drive transistor is determined by a pulse width of the third control signal during the threshold voltage detection stage.

14. The display panel according to claim 13, wherein compensation ranges for the threshold voltage of the pixel compensation circuit are different due to different pulse widths of the third control signal.

15. The display panel according to claim 14, wherein the co mpensation range for the threshold voltage of the pixel compensation circuit is −0.85V to 1.45V.

16. The display panel according to claim 14, wherein the threshold voltage compensation stage comprises a first compensation stage and a second compensation stage, and the third control signal in the first compensation stage and the third control signal in the second compensation stage are inverted.

* * * * *